United States Patent
Andersson et al.

(10) Patent No.: US 12,194,830 B2
(45) Date of Patent: Jan. 14, 2025

(54) SYSTEM AND METHOD FOR INSTALLATION OF TRACTION BATTERIES FOR A VEHICLE

(71) Applicant: Volvo Truck Corporation, Gothenburg (SE)

(72) Inventors: Krister Andersson, Särö (SE); Roger Hedlund, Hovås (SE); Guilherme Selbach, Hisings Backa (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/584,095

(22) Filed: Feb. 22, 2024

(65) Prior Publication Data
US 2024/0190232 A1    Jun. 13, 2024

Related U.S. Application Data

(63) Continuation of application No. 17/599,108, filed as application No. PCT/EP2019/058536 on Apr. 4, 2019, now Pat. No. 11,938,804.

(51) Int. Cl.
*B60K 1/04* (2019.01)
*H01M 50/249* (2021.01)

(52) U.S. Cl.
CPC ............ *B60K 1/04* (2013.01); *H01M 50/249* (2021.01); *B60K 2001/0438* (2013.01); *B60K 2001/0472* (2013.01); *B60K 2001/0494* (2013.01)

(58) Field of Classification Search
CPC .... B60K 2001/0461; B60K 2001/0455; B60K 2001/0472; B60K 2001/0494; H01M 50/249
See application file for complete search history.

(56) References Cited

U.S. PATENT DOCUMENTS

| 9,517,686 | B1 * | 12/2016 | Paramasivam | ..... H01M 50/244 |
| 9,827,840 | B2 | 11/2017 | Wen | |

(Continued)

FOREIGN PATENT DOCUMENTS

| CN | 102300734 A | 12/2011 |
| CN | 105083233 A | 11/2015 |

(Continued)

OTHER PUBLICATIONS

Notice of Allowance for U.S. Appl. No. 17/599,108, mailed Jan. 4, 2024, 9 pages.

(Continued)

*Primary Examiner* — Jeffrey J Restifo
(74) *Attorney, Agent, or Firm* — Withrow & Terranova, PLLC

(57) ABSTRACT

A system for installation of traction batteries for a vehicle having a chassis comprising at least one load-carrying frame member. A front bracket member and a rear bracket member are adapted to be secured to and project from the frame member of the vehicle for receiving a traction battery between the front bracket member and the rear bracket member. The system also comprises a first and a second slider adapted to be connected to a front and a rear side, respectively, of a traction battery. The sliders are adapted to be mated with the bracket members subsequently to the sliders having been connected to the traction battery, thereby enabling the traction battery by means of the connected sliders to be received by the bracket members and be moved towards the frame member of the vehicle.

12 Claims, 17 Drawing Sheets

(56) References Cited

U.S. PATENT DOCUMENTS

| | | | |
|---|---|---|---|
| 10,005,350 B1* | 6/2018 | Khan | B60K 1/04 |
| 11,043,714 B2* | 6/2021 | Sloan | H01M 50/262 |
| 11,685,268 B2* | 6/2023 | Sjöholm | B62D 27/02 |
| | | | 180/68.5 |
| 11,766,925 B2* | 9/2023 | Landvik | H01M 50/204 |
| | | | 180/68.5 |
| 11,794,595 B2* | 10/2023 | Ragot | B60L 50/66 |
| 11,932,098 B2* | 3/2024 | Hendriks | B60K 1/04 |
| 11,938,804 B2* | 3/2024 | Andersson | B60K 1/04 |
| 2006/0096794 A1* | 5/2006 | Yoshida | B60L 50/66 |
| | | | 180/68.5 |
| 2008/0006459 A1* | 1/2008 | Niebuhr | B66F 9/0754 |
| | | | 180/68.5 |
| 2015/0037625 A1* | 2/2015 | Wen | B60L 50/64 |
| | | | 429/96 |
| 2021/0122262 A1* | 4/2021 | Gaussin | B60K 1/04 |
| 2021/0284005 A1* | 9/2021 | Yun | H01M 10/425 |
| 2021/0380001 A1* | 12/2021 | Hörder | B60L 50/64 |
| 2021/0387519 A1* | 12/2021 | Landvik | H01M 50/244 |
| 2021/0387534 A1* | 12/2021 | Sjöholm | B60L 50/66 |
| 2022/0097537 A1* | 3/2022 | Prothery | B60L 50/66 |
| 2022/0111716 A1* | 4/2022 | McKibben | B60L 50/62 |
| 2022/0111717 A1* | 4/2022 | Hendriks | B60K 1/04 |
| 2022/0126706 A1* | 4/2022 | Ragot | B60L 50/66 |
| 2022/0169104 A1* | 6/2022 | Andersson | B60K 1/04 |
| 2022/0281306 A1* | 9/2022 | Landvik | B62D 21/04 |
| 2023/0015644 A1* | 1/2023 | Hörder | H01M 50/296 |
| 2023/0173904 A1* | 6/2023 | Ragot | B60L 50/66 |
| | | | 180/68.5 |
| 2023/0202282 A1* | 6/2023 | Ragot | B60L 50/66 |
| | | | 180/68.5 |
| 2023/0302888 A1* | 9/2023 | Kümmel | B60K 1/04 |
| 2024/0149657 A1* | 5/2024 | Coupal-Sikes | F16B 43/001 |

FOREIGN PATENT DOCUMENTS

| | | |
|---|---|---|
| CN | 206406988 U | 8/2017 |
| CN | 107848431 A | 3/2018 |
| CN | 109050233 A | 12/2018 |
| DE | 2359054 A1 | 7/1974 |
| DE | 202016103720 U1 | 8/2016 |
| EP | 2554420 A1 | 2/2013 |
| FR | 2942997 A1 | 9/2010 |
| KR | 20050099576 A | 10/2005 |
| WO | 2007029838 A1 | 3/2007 |
| WO | 2017207970 A1 | 12/2017 |

OTHER PUBLICATIONS

First Office Action for Chinese Patent Application No. 201980095128.1, mailed Jul. 25, 2023, 12 pages.

International Search Report and Written Opinion for International Patent Application No. PCT/EP2019/058536, mailed Nov. 25, 2019, 13 pages.

International Preliminary Report on Patentability for International Patent Application No. PCT/EP2019/058536, mailed May 11, 2020, 14 pages.

* cited by examiner

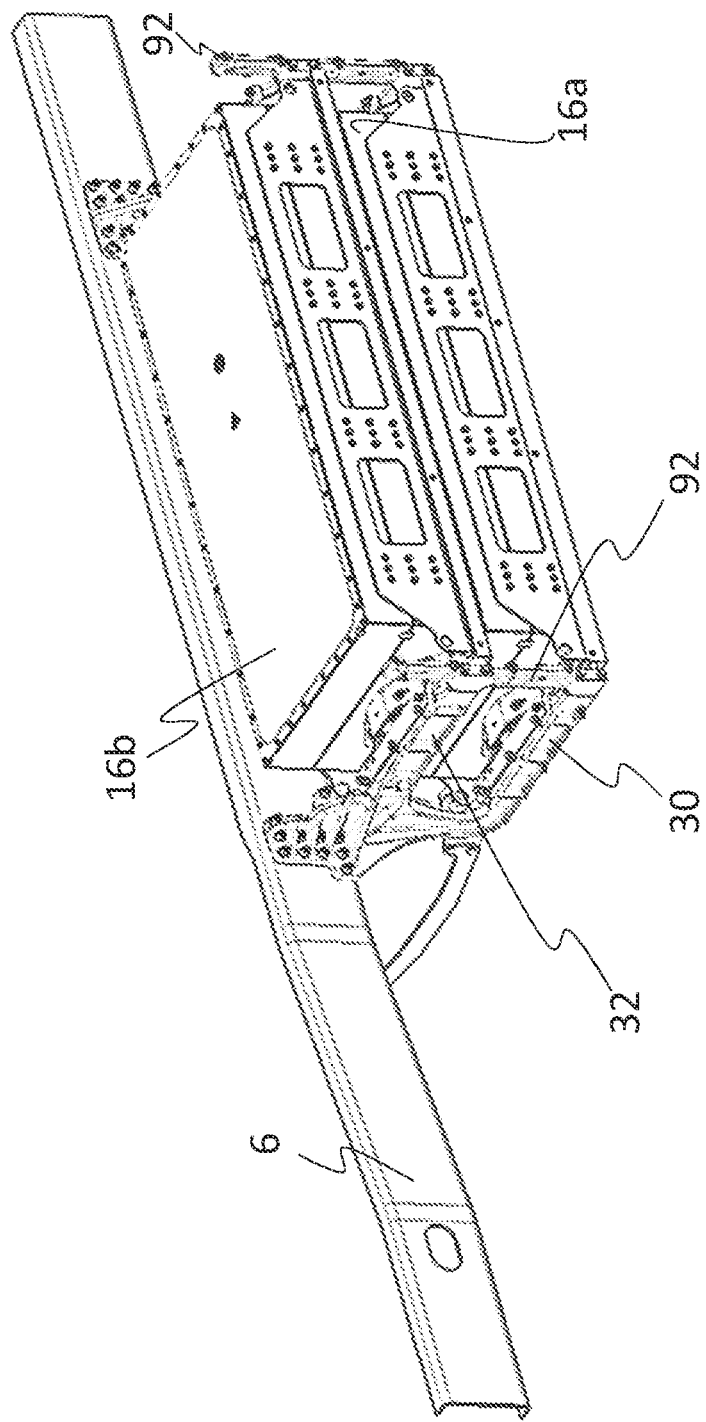

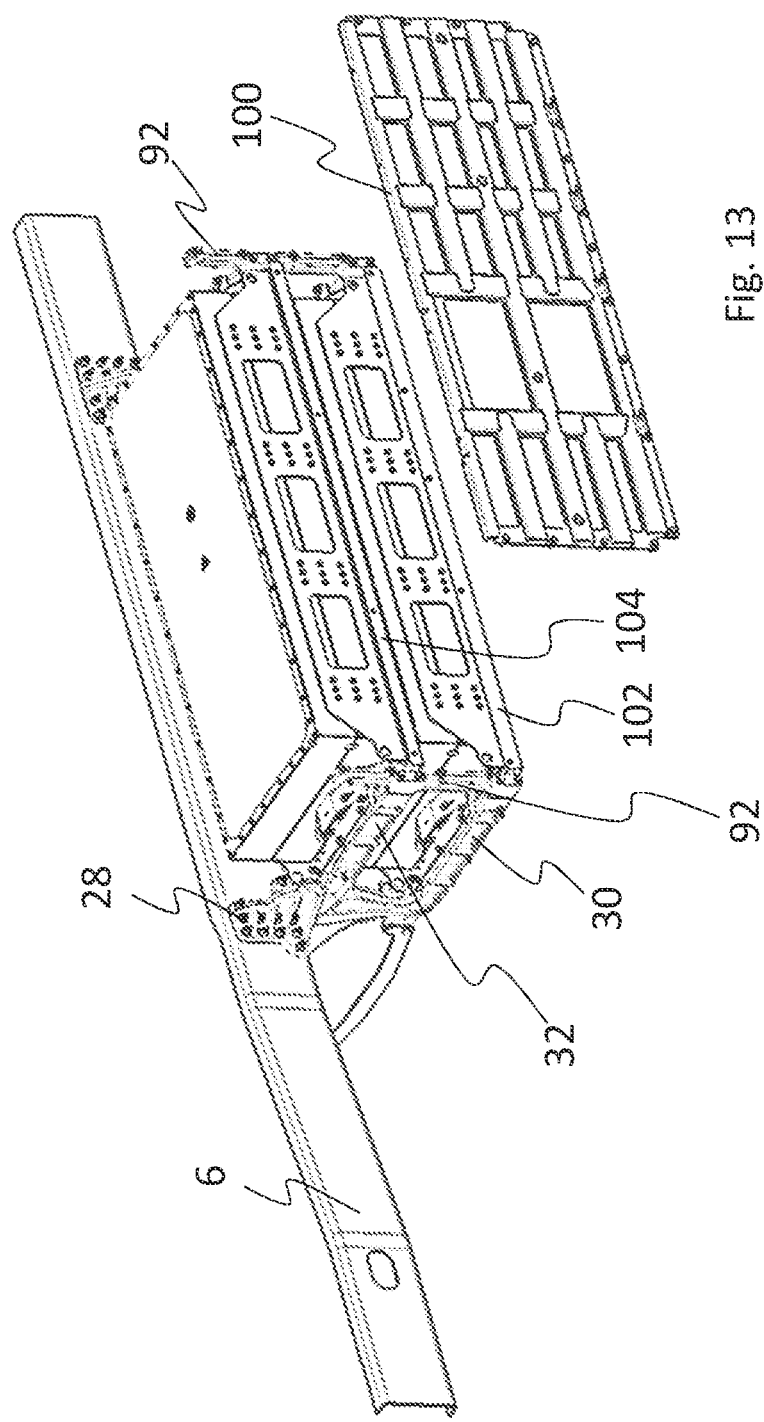

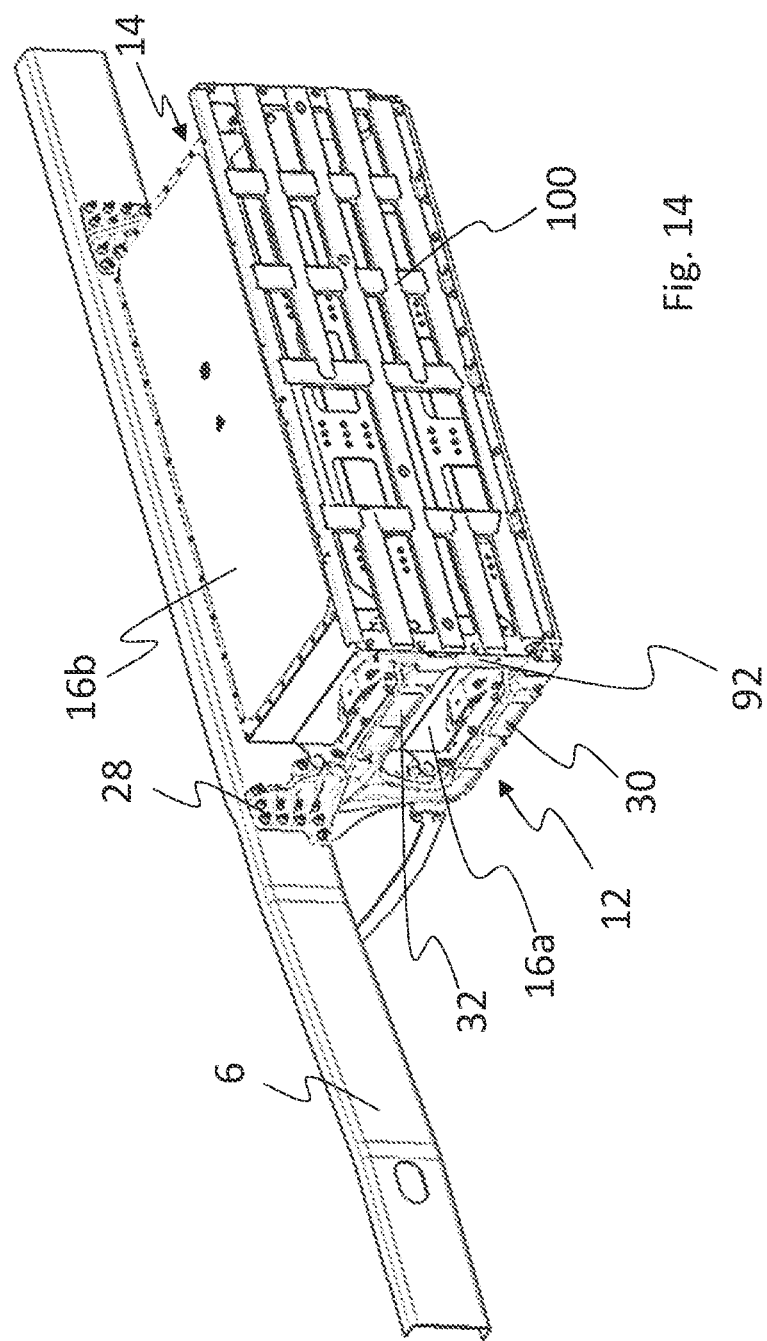

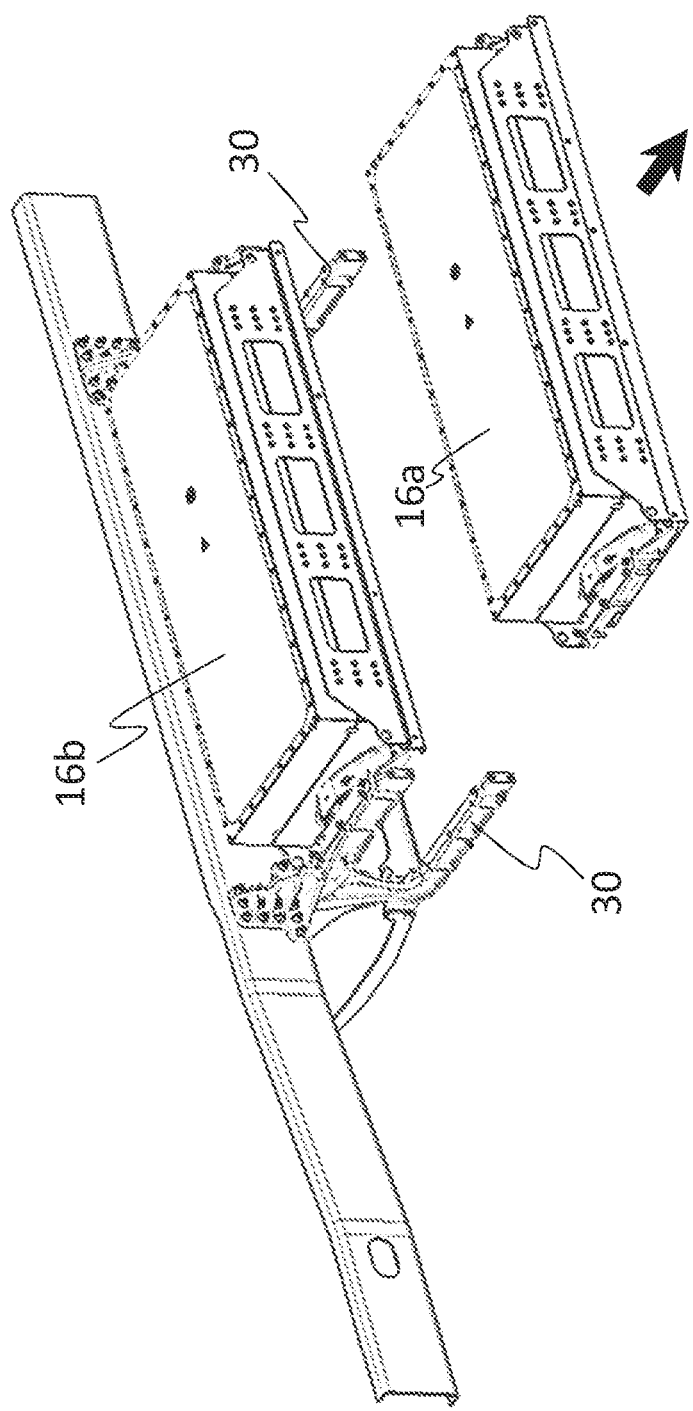

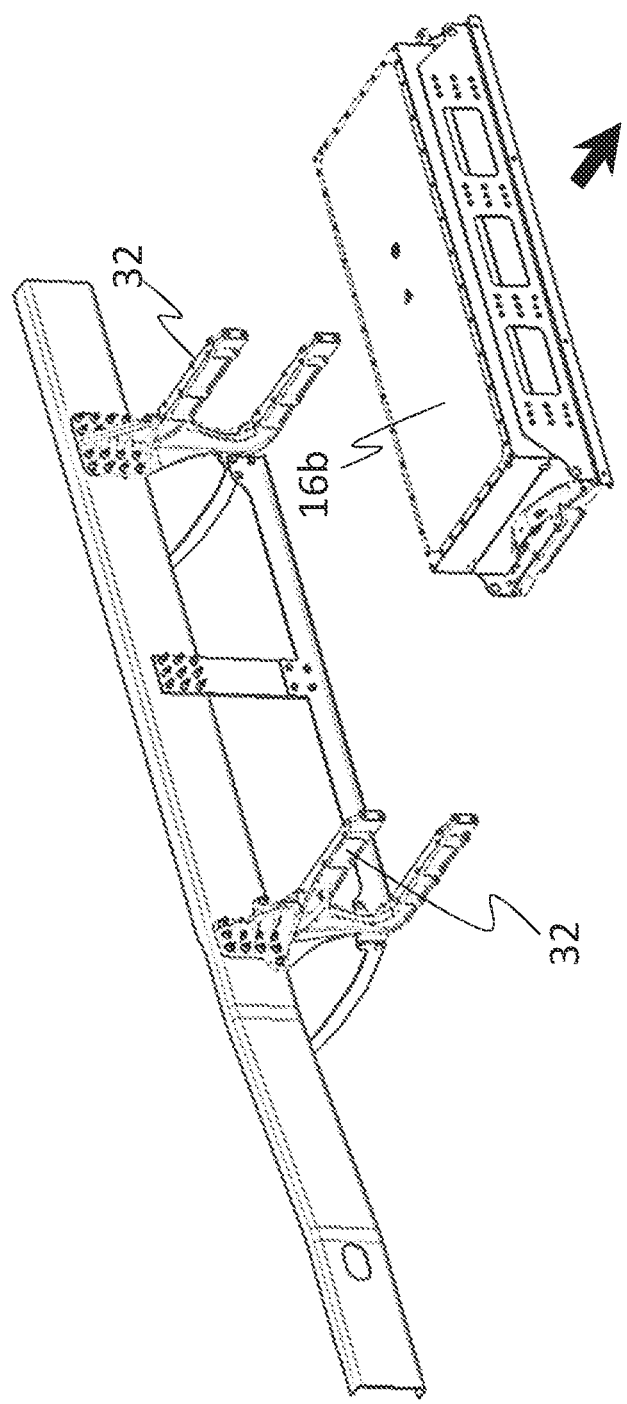

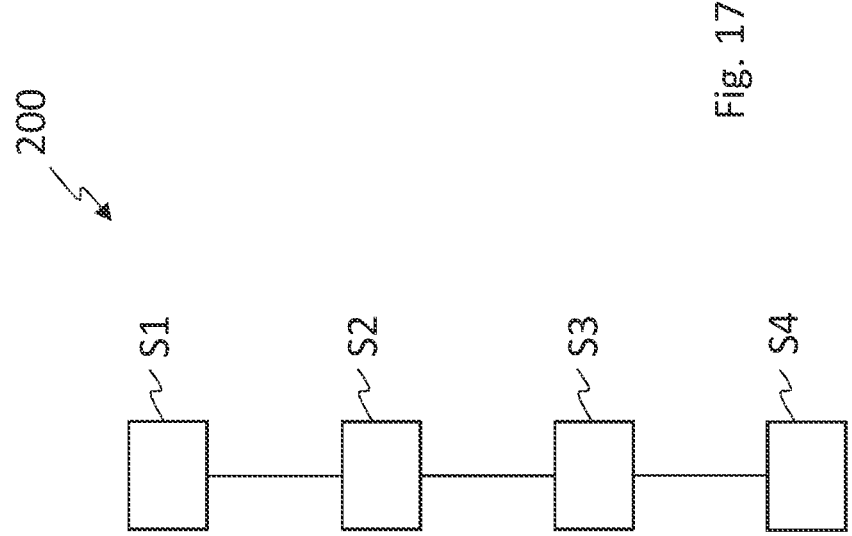

007
SYSTEM AND METHOD FOR INSTALLATION OF TRACTION BATTERIES FOR A VEHICLE

PRIORITY APPLICATIONS

The present application is a continuation of U.S. patent application Ser. No. 17/599,108, filed on Sep. 28, 2021, now U.S. Pat. No. 11,938,804, which is a 35 U.S.C. § 371 national phase filing of International Application No. PCT/EP2019/058536, filed Apr. 4, 2019, the disclosures of which are incorporated herein by reference in their entireties. Priority is claimed to each of the aforementioned applications.

TECHNICAL FIELD

The invention relates to a system for installation of traction batteries for a vehicle having a chassis comprising at least one load-carrying frame member. The invention also relates to a battery arrangement comprising such a system. The invention furthermore relates to a vehicle and a method of installation of traction batteries.

The invention can be applied in heavy-duty vehicles, such as trucks, buses and construction equipment. Although the invention will be described with respect to a truck, the invention is not restricted to this particular vehicle, but may also be used in other vehicles such as passenger cars.

BACKGROUND

Most trucks today are powered by internal combustion engines. However, there is increasing development of high-voltage traction batteries for replacing internal combustion engines and providing fully electric trucks.

WO 2017/207970 A1 discloses a mounting arrangement for mounting a range extender or a battery storage to a vehicle. The mounting arrangement comprises mounting brackets for securing a battery to a cage-like frame. The battery can be placed in the frame which can then be slid along two bracket members. Thus, the cage-like frame functions similarly to a drawer being attached with rails to a chest of drawers. The battery must be lowered into the frame, and then the frame with the battery may be slid into place. When the battery is to be replaced it must be lifted up from the cage-like frame.

It would be desirable to provide a simpler solution for mounting a battery to a vehicle, which would be advantageous both for serial production and for service/aftermarket situations.

SUMMARY

An object of the invention is to provide a system which alleviates the drawbacks of the prior art.

According to a first aspect of the invention, the object is achieved by a system for installation of traction batteries for a vehicle having a chassis comprising at least one load-carrying frame member, in accordance with claim 1. The system comprises:

a front bracket member adapted to be secured to and project from a frame member of the vehicle, a rear bracket member adapted to be secured to and project from the frame member of the vehicle so that the rear bracket member is spaced apart from the front bracket member for receiving a traction battery between the front bracket member and the rear bracket member, wherein each one of the front bracket member and the rear bracket member comprises a respective sliding surface, a first slider adapted to be connected to a front side of a traction battery, and a second slider adapted to be connected to an opposite rear side of the traction battery, wherein the first slider is adapted to be mated with the sliding surface of the front bracket member and the second slider is adapted to be mated with the sliding surface of the rear bracket member subsequently to the first slider and the second slider having been connected to the traction battery, thereby enabling the traction battery by means of the connected sliders to be received by the front and rear bracket members and be moved, for example slid, towards the frame member of the vehicle.

By the provision of a system according to the invention, a simple installation of traction batteries is achievable. An operator may simply use a pallet lifter or the like to mount or remove a battery from the system. Notably, contrary to the prior art, according to the present invention, the first and second sliders are attached to the traction battery, and only thereafter will they be brought to mate with the sliding surfaces of the bracket members.

It should be understood that in this disclosure terms such as front and rear, relate to directional configurations of a vehicle. Thus, front is towards the normal driving direction, while rear is towards the direction in which the vehicle is operated when in reverse drive. The cab of a truck, is normally located at the front of the truck.

It should furthermore be understood that directional terms such as upper and lower, etc. are defined with respect to normal operating conditions. For instance, the term "upper" normally denotes something that is located farther from the ground on which a vehicle stands, while the term "lower" will be located closer to the ground. In other words, compared to the term "lower, the term "upper" denotes a vertically higher level relative to the ground.

According to at least one exemplary embodiment, the system comprises a receiving structure, wherein the receiving structure comprises said front bracket member, said rear bracket member and a stabilizing element, wherein the front bracket member and the rear bracket member are spaced apart and interconnected by the stabilizing element, wherein the receiving structure is adapted to be secured to a frame member of the vehicle and adapted to receive a traction battery between the front bracket member and the rear bracket member. The provision of a stabilizing element makes the system as such stronger, and allows a more secure holding of the traction battery.

According to at least one exemplary embodiment, each one of the front bracket member and the rear bracket member comprises a securing portion for securing the bracket member to a frame member of the vehicle, and at least one arm portion projecting from the securing portion. The arm portions are advantageous in that they provide front/rear limitations to the traction battery, and apart from a guiding function also provides some amount of protection to the traction battery. The stabilizing element may suitably extend between the securing portions of the bracket members. In some exemplary embodiments. The stabilizing element may similarly to the securing portions be used for securing the receiving structure to a frame member of the vehicle.

It is also conceivable to have an intermediate securing bracket located between the securing portions of the front and rear bracket members, which intermediate securing bracket may be used for connecting the stabilizing element to a frame member of the vehicle. In some exemplary embodiments the stabilizing element may extend between the arm portions.

According to at least one exemplary embodiment, each one of the front bracket member and the rear bracket member comprises two vertically spaced arm portions, namely a lower arm portion and an upper arm portion, both projecting from the securing portion, wherein each one of the lower arm portion and the upper arm portion is provided with said sliding surface. This is advantageous since this allows for more traction batteries to be received, which is further reflected in the following exemplary embodiment.

According to at least one exemplary embodiment, the lower arm portion of the front bracket member and the lower arm portion of the rear bracket member are adapted to slidingly receive a first traction battery to which said first and second sliders have been connected, the system further comprising a third and a fourth slider, wherein the upper arm portion of the front bracket member and the upper arm portion of the rear bracket member are adapted to slidingly receive a second traction battery to which said third and fourth sliders have been connected. By providing two vertically separated pairs of arms portions, two traction batters may be provided, one above the other. The batteries may easily be mounted, for example by means of a pallet lifter, to the respective pair of arm portions. Each bracket member will thus have a generally U-shaped configuration, wherein the securing portion will form the central base of the U-shape, and the arm portions will form the legs of the U-shape. In any exemplary embodiment the one or more arms of a bracket member may suitably have a substantially horizontal extension, and may suitably project substantially perpendicularly to the frame member to which the bracket member is to be attached (and therefore it may also project substantially perpendicularly to a surface of the securing portion of the bracket member, which surface is configured to mate with the frame member).

According to at least one exemplary embodiment, the system comprises a crash protection structure adapted to be mounted to a free end of the at least one arm portion of each one of the front bracket member and the rear bracket member when a traction battery has been received therebetween, such that the traction battery becomes enclosed by the frame member of the vehicle, the front bracket member, the rear bracket member and the crash protection structure. This is advantageous since it provides extra protection to the traction battery, in particular to lateral impact load.

According to at least one exemplary embodiment, each arm portion has a longitudinal extension projecting from the securing portion to its free end, wherein, when the crash protection structure is mounted to the free end of the arm portion, the main extension of the crash protection structure lies in a geometrical plane which is perpendicular to the longitudinal extension of the arm portion. Similarly to above, this provides extra protection to the traction battery, in particular to lateral impact load.

According to at least one exemplary embodiment, the system comprises a protecting bottom plate adapted to be joined to a lower side of a traction battery. This is advantageous since it protects the traction battery from below.

According to at least one exemplary embodiment, said protecting bottom plate is adapted to be joined to a lower side of the first traction battery, the system further comprising a horizontal side collision protection plate adapted to be joined to a lower side of the second traction battery. This is advantageous since it provides extra protection in case of a lateral collision. Suitably, in at least some exemplary embodiments, one or both of the protecting bottom plate and the horizontal side collision protection plate may have a bent upwardly extending edge at the side configured to be farthest away from the frame member of the vehicle (and therefore farthest away from the securing portions of the bracket members). Such a bent upwardly extending edge (which may form an L-shaped cross section with the horizontally extending main portion of the plate) may be used for further securing the crash protection structure. For instance, the crash protection structure may be secured by fastening means, such as bolts, rivets, etc. to such a bent upwardly extending edge of said protecting bottom plate and/or said horizontal side collision protection plate.

According to at least one exemplary embodiment, the system comprises a bushing, wherein the first slider is adapted to be connected to the front side of the traction battery via said bushing. This is advantageous since it provides a certain degree of resiliency/flexibility.

According to at least one exemplary embodiment, the system comprises two bushings, wherein said bushing is a first bushing for connecting said first traction battery to the first slider, the system further comprising a second bushing for connecting said second traction battery to said third slider. Similarly to above, this provides a certain degree of resiliency/flexibility.

According to a second aspect of the present invention, there is provided a battery arrangement. The battery arrangement comprises a system according to the first aspect (including any embodiments thereof) and a traction battery, wherein said first slider is connected, or is adapted to be connected, to a front side of the traction battery, and wherein said second slider is connected, or is adapted to be connected, to an opposite rear side of the traction battery. The advantages are substantially analogous to those mentioned in connection with the discussion of the first aspect of the invention (including any embodiments thereof).

According to a third aspect of the invention, there is provided a vehicle. The vehicle comprises a chassis comprising at least one load-carrying frame member, and a system according to the first aspect (including any embodiments thereof) and a battery arrangement according to the second aspect (including any embodiments thereof), wherein the front bracket member is secured to and projects from the frame member, and the rear bracket member is secured to and projects from the frame member, spaced apart from the front bracket member. The advantages are substantially analogous to those mentioned in connection with the discussion of the first and second aspects of the invention (including any embodiments thereof).

According to a fourth aspect of the invention, there is provided a method for installation of traction batteries to a vehicle having a chassis comprising at least one load-carrying frame member to which a front bracket member and a rear bracket member are secured to and projects from, the rear bracket member being spaced apart from the front bracket member, for receiving a traction battery between the front bracket member and the rear bracket member, wherein each one of the front bracket member and the rear bracket member comprises a respective sliding surface, the method comprising the steps of:

connecting a first slider to a front side of a traction battery,
connecting a second slider to an opposite rear side of the traction battery,
mating the first slider with the sliding surface of the front bracket member and the second slider with the sliding surface of the rear bracket member subsequently to the first slider and the second slider having been connected to the traction battery, moving, for example sliding, the traction battery by means of the connected sliders towards the frame member of the vehicle.

By this method, a simple and efficient installation may be made with, for instance, a pallet lifter. There is thus no need to (as in the prior art) carefully lowering and fitting a battery into a cage, before the cage with the battery is pushed into place. Rather, the traction battery may smoothly be placed in the correct location by a substantially horizontal movement. If desired, the surrounding protection offered by a cage, may be achieved by thereafter securing a crash protection structure, as mentioned above in connection with the discussion of the first aspect of the invention. Indeed any features and embodiments of the first, second and third aspects of the invention may suitably be implemented in connection with the method of the fourth aspect of the invention.

For example, according to at least one exemplary embodiment of the method of the fourth aspect, the front bracket member, rear bracket member, first slider and second slider are included in a system according to the first aspect (including any embodiments thereof).

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 7-14 illustrate a sequence in which the first traction battery and the second traction battery are installed in a vehicle.

FIGS. 15-16 illustrate a sequence in which the first traction battery and the second traction battery are removed from the vehicle, for instance for being replaced by new traction batteries, and FIG. 17 shows a flow chart representation of a method for installation of traction batteries, in accordance with at least one exemplary embodiment of the invention.

DETAILED DESCRIPTION

Figure 1:
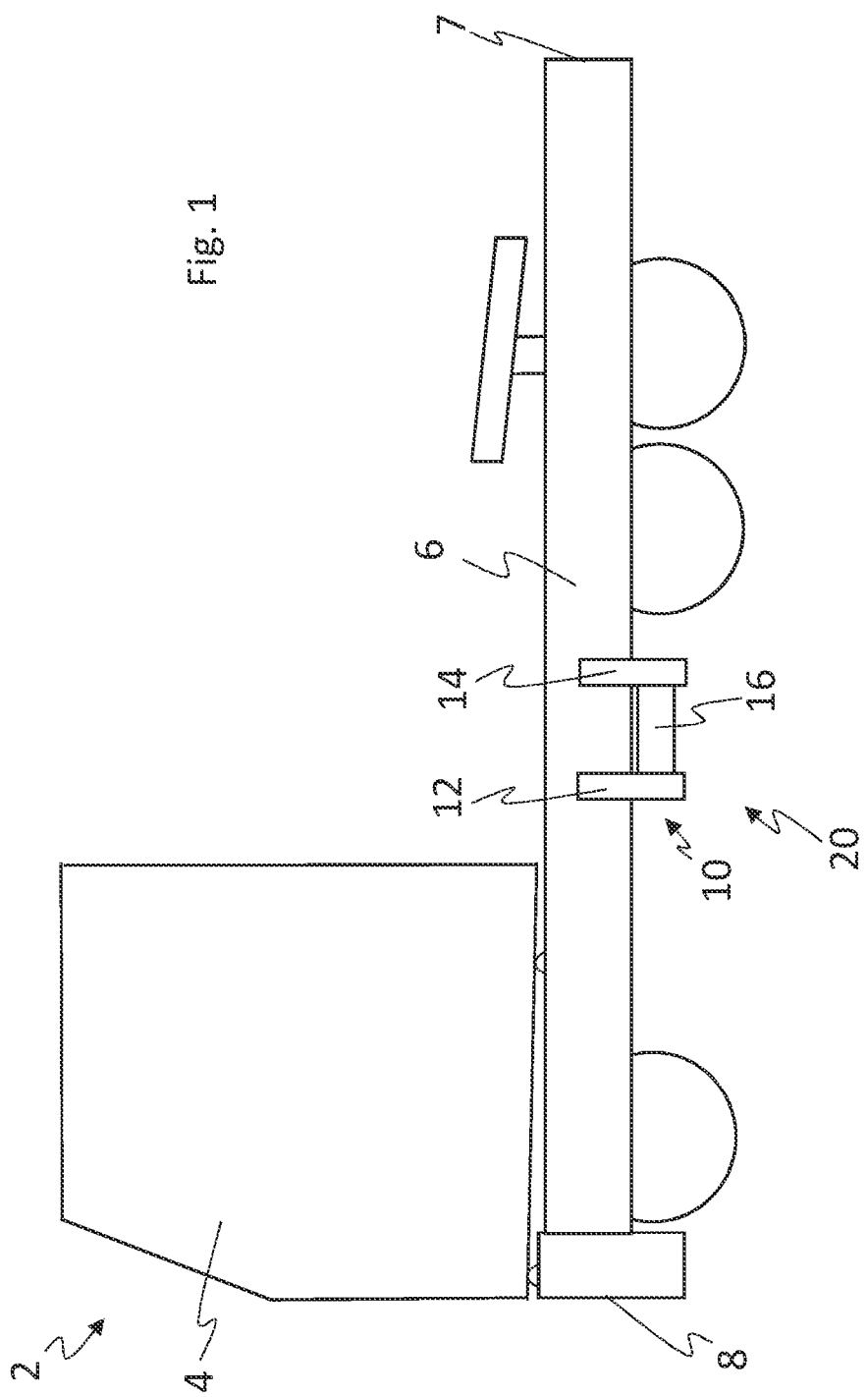
FIG. 1 is a schematic illustration of a vehicle comprising a system for installation of a traction battery, in accordance with at least one exemplary embodiment of the invention.

FIG. 1 is a schematic illustration of a vehicle 2 comprising a system 10 according to at least one exemplary embodiment of the invention. Although the vehicle 2 is illustrated in the form of a truck, other types of vehicles, such as busses or construction equipment may be used with the inventive system 10.

The truck (vehicle) comprises a cab 4 in which a driver may operate the vehicle 2. The vehicle 2 has a chassis comprising at least one load-carrying frame member 6. A longitudinal frame member 6 is here illustrated as extending in the direction from rear 7 to front 8 of the vehicle 2. Suitably, the vehicle 2 may have two or more such frame members extending in parallel.

The inventive system 10 comprises a front bracket member 12 and a rear bracket member 14, which have been secured to and project from the frame member 6 of the vehicle 2. The front bracket member 12 and the rear bracket member 14 are spaced apart in the longitudinal direction of the vehicle 2. In other words, the front bracket member 12 is, compared to the rear bracket member 14, located closer to the front 8 of the vehicle 2. Conversely, the rear bracket member 14 is, compared to the front bracket member 12, located closer to the rear 6 of the vehicle 2.

A traction battery 16 has been received by, and extends between, the front bracket member 12 and the rear bracket member 14. The traction battery 16 together with the system 10 form part of a battery arrangement 20, in accordance with at least one exemplary embodiment of the invention.

Further details of the system 10, its components and their interaction with the traction battery will be discussed in relation to the other drawing figures. It should, however, be noted that although two traction batteries are shown in the other figures, the system 10, the battery arrangement 20, the vehicle 2 and the method of the present invention, may likewise be implemented with one traction battery. Accordingly, in the exemplary embodiment of FIG. 1, only one traction battery 16 is shown, although in other exemplary embodiments (as in the other drawing figures) two (or even more) traction batteries could be used with the present invention. Similarly, it should be noted that although the other drawing figures show front and rear bracket members with vertically spaced upper and lower arm portions, the system 10, the battery arrangement 20, the vehicle 2 and the method of the present invention, may have front and rear bracket members with only one arm portion for receiving only one traction battery. For instance, in the exemplary embodiment represented by the schematic illustration in FIG. 1 the front bracket member 12 and the rear bracket member 14 may each have a securing portion for securing the bracket member to the frame member 6 of the vehicle 2 and an arm portion projecting from the securing portion. In other exemplary embodiments, the front bracket member 12 and the rear bracket member 14 may each have two vertically spaced arm portions (or even more) similarly to the other drawing figures.

Figure 2:
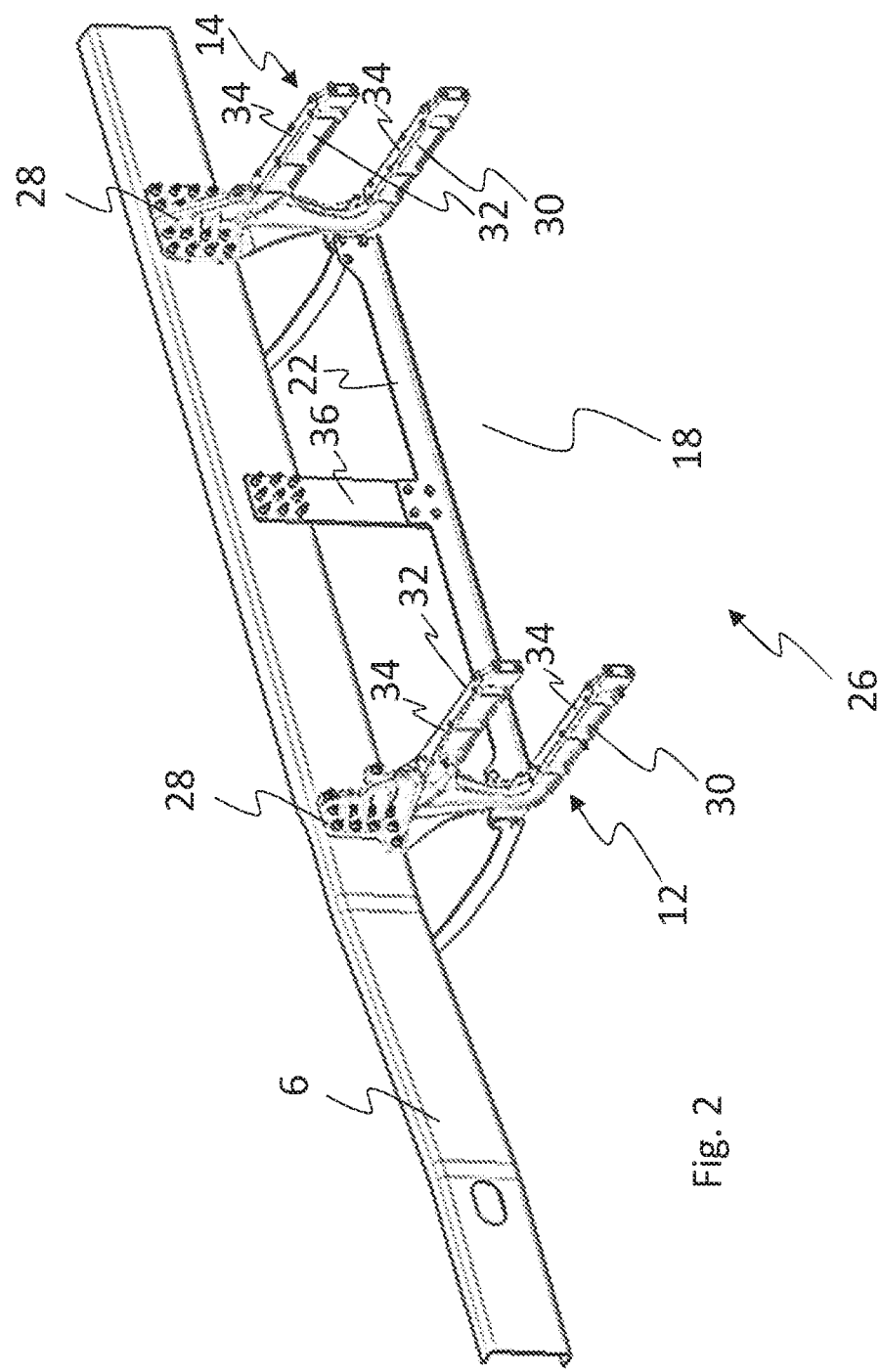
FIG. 2 illustrates parts of a system for installation of traction batteries, in accordance with at least one exemplary embodiment of the invention.

FIG. 2 illustrates parts of a system for installation of traction batteries, in accordance with at least one exemplary embodiment of the invention. The system comprises a front bracket member 12 and a rear bracket member 14, both of which are adapted to be secured to a frame member 6 of a vehicle chassis. In FIG. 2 the front bracket member 12 and the rear bracket member 14 are illustrated in a secured state, i.e. they have been firmly fastened to the frame member 6.

The front bracket member 12 is spaced apart from the rear bracket member 14, thereby defining a space 18 in which a traction battery may be received. The separating distance, i.e. the extension of the space 18 in the longitudinal direction of the vehicle, substantially corresponds to the length of a traction battery to be received.

The front bracket member 12 and the rear bracket member 14 are interconnected by a stabilizing element 22, providing extra strength and rigidity to the system. However, in other exemplary embodiments, the stabilizing element 22 may be omitted. These three components 12, 14, 22 form part of a receiving structure 26. The receiving structure 26 is adapted to (and in FIG. 2 has been) secured to the frame member 6. Thus, the receiving structure 26 is adapted to receive a traction battery between the front bracket member 12 and the rear bracket member 14.

Each one of the front bracket member 12 and the rear bracket member 14 comprises a securing portion 28 for securing the bracket to the frame member 6 and two arm portions 30, 32 projecting from the securing portion 28. However, as mentioned previously, in other exemplary embodiments only one arm portion projects from the securing portion 28.

The two arm portions 30, 32 are vertically spaced, presenting a lower arm portion 30 and an upper arm portion 32. Both the lower arm portion 30 and the upper arm portion 32 project away from the securing portion 28. Each arm portion has a sliding surface 34. In the present exemplary embodiment, the sliding surface 34 is a top surface of the respective arm portion 30, 32. However, it is conceivable in other embodiments, to have a sliding surface which is not at the top of the arm portion, for instance the sliding surface may be formed on a ledge.

In exemplary embodiments, such as illustrated in FIG. 2, the securing portions 28 are secured by fastening means, such as bolts, rivets, to the frame member 6. In other embodiments the securing portions 28 may be welded to the frame member 6. In some exemplary embodiments, an intermediate securing bracket 36 may be connected to the stabilizing element 22 (such as illustrated in FIG. 2). The intermediate securing bracket 36 may, similarly to the securing portions 28 be secured to the frame member 6, for instance, by means of fastening means, such as bolts, rivets, etc., or by welding.

Figure 3:
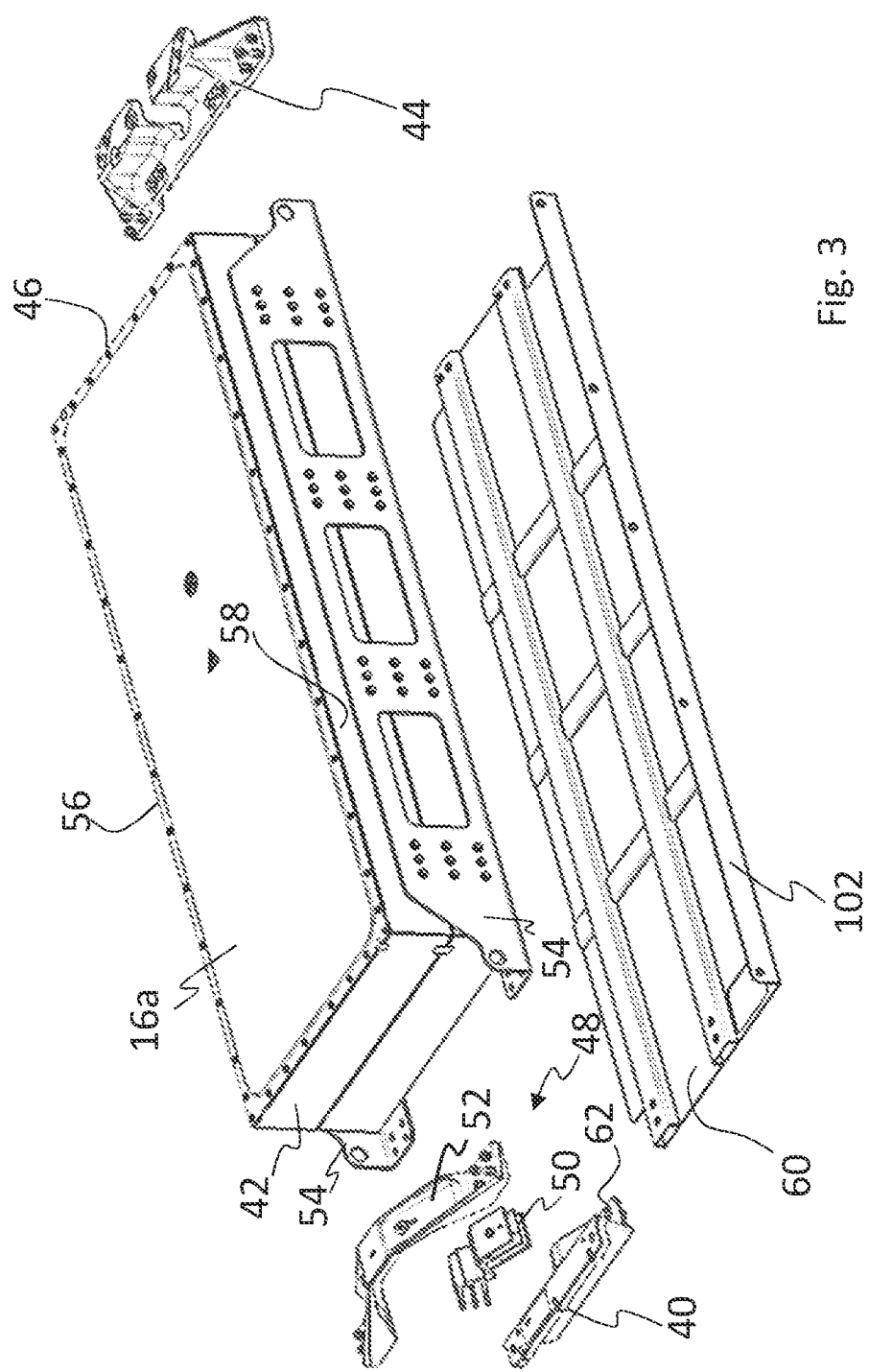
FIG. 3 illustrates further parts of the system and a first traction battery to which the further parts are connectable, in accordance with at least one exemplary embodiment of the invention.
Figure 4:
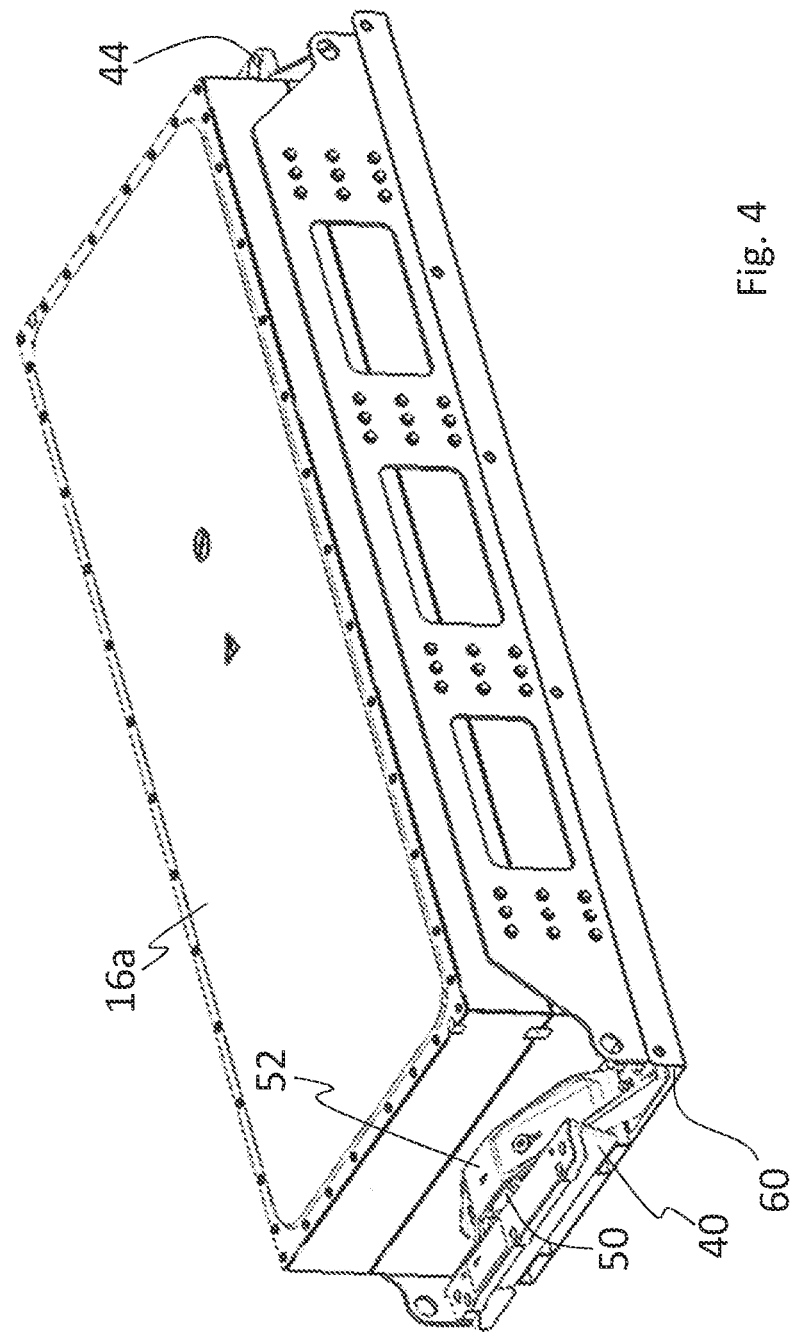
FIG. 4 illustrates the first traction battery after the further parts in FIG. 3 have been connected to the first traction battery.

FIG. 3 illustrates further parts of the system and a first traction battery 16a to which the further parts are connectable, in accordance with at least one exemplary embodiment of the invention. FIG. 4 illustrates the first traction battery 16a after the further parts in FIG. 3 have been connected to the first traction battery 16a.

FIG. 3 illustrates a first slider 40 adapted to be connected to a front side 42 of the traction battery 16a and a second slider 44 adapted to be connected to an opposite rear side 46 of the traction battery 16a. The first slider 40 is configured to be mated with the sliding surface 34 of the front bracket member 12 in FIG. 2, and the second slider 44 is configured to be mated with the sliding surface 34 of the rear bracket member 14 in FIG. 2, after the first slider 40 and the second slider 44 have been connected to the first traction battery 16a. The first traction battery 16a is thereby enabled, by means of the connected first slider 40 and second slider 44, to be received by the front bracket member 12 and the rear bracket member 14 and be moved (for instance, slid) towards the frame member 6 of the vehicle. It should be understood that although the system comprises sliders 40, 44 and sliding surfaces 34, it is not mandatory that the first traction battery 16a is slid into place, as it would be possible to for example lift the first traction battery 16a (with the sliders 40, 44 mounted to it) onto the sliding surfaces 34 of the front bracket member 12 and the rear bracket member 14.

Continuing with FIG. 3, the first slider 40 is adapted to be connected to the front side 42 of the traction battery 16a via a bushing 48, which may for instance include two rubber parts 50 and a profiled element 52. The two rubber parts 50 and the first slider 40 may be connected to each other by screw connections. The profiled element 52 may in turn also have a screw connection to the rubber parts 50, and in addition be secured (e.g. by screw connection) to mounting plates 54 connected to the traction battery 16a. The mounting plates 54a are here illustrated as located on opposite lateral sides 56, 58 of the first traction battery 16a. FIG. 3 further illustrates that the system may comprise a protecting bottom plate 60 adapted to be joined to a lower side of the first traction battery 16a via the first slider 40 and the second slider 44. The first slider 40 has a portion 62 which may be screw-connected to the protecting bottom plate 60. Thus, as can be seen in FIG. 4, when the first slider 40 has been secured to the first traction battery 16a, the first slider 40 will at least partly be clamped between the protecting bottom plate 60 and the rubber parts 50 under the profiled element 52. This will provide a degree of cushioning and resiliency/flexibility to the first slider 40.

Turning back to FIG. 3, the second slider 44 is adapted to be rigidly connected to the protecting bottom plate 60, and to be rigidly connected to the mounting plates 54. However, it would be conceivable in other exemplary embodiments, to have the second slider 44 flexibly connected to the first traction battery 16a, similarly to the first slider 40.

Figure 5:
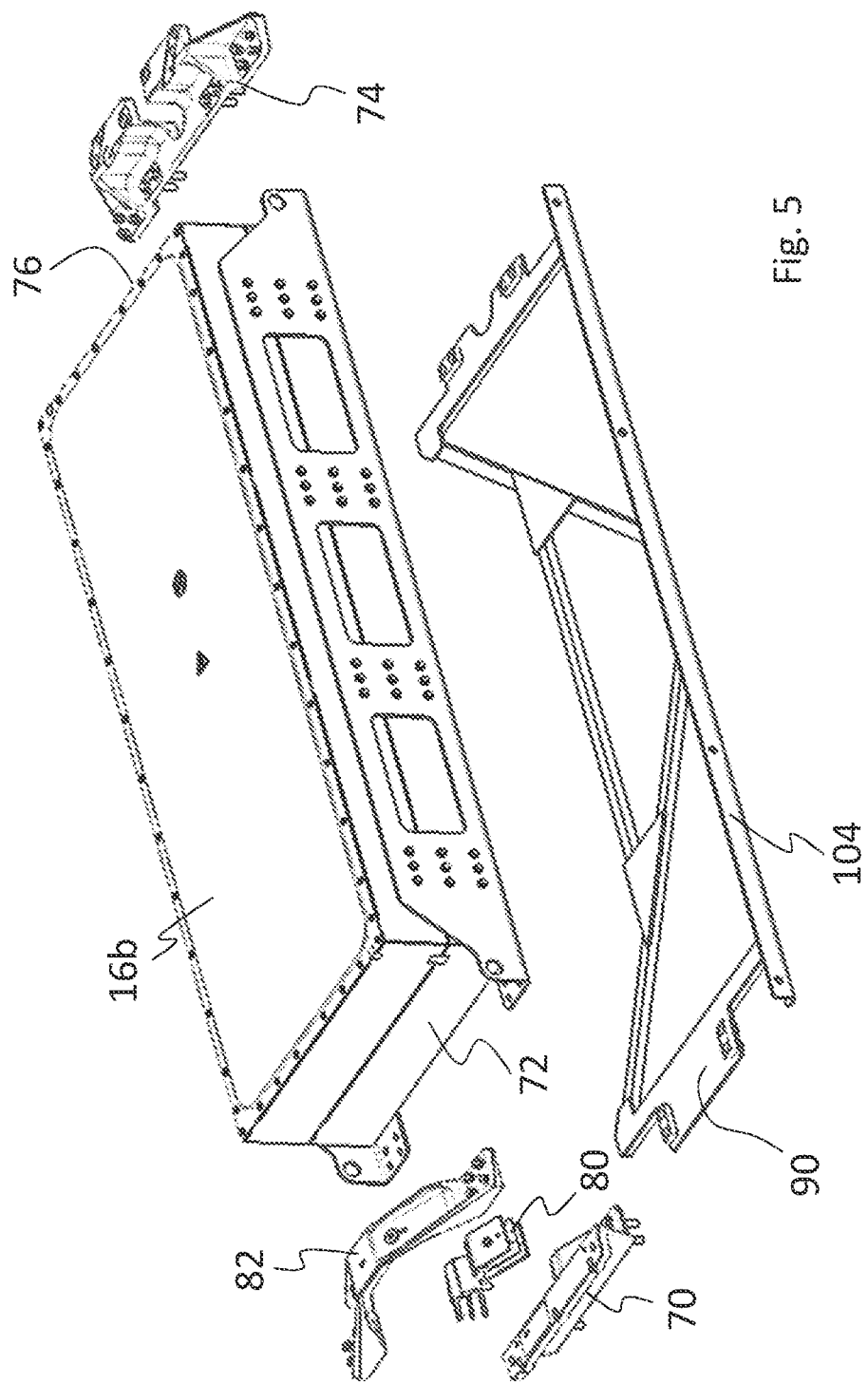
FIG. 5 illustrates further parts of the system and a second traction battery to which the further parts are connectable, in accordance with at least one exemplary embodiment of the invention.
Figure 6:
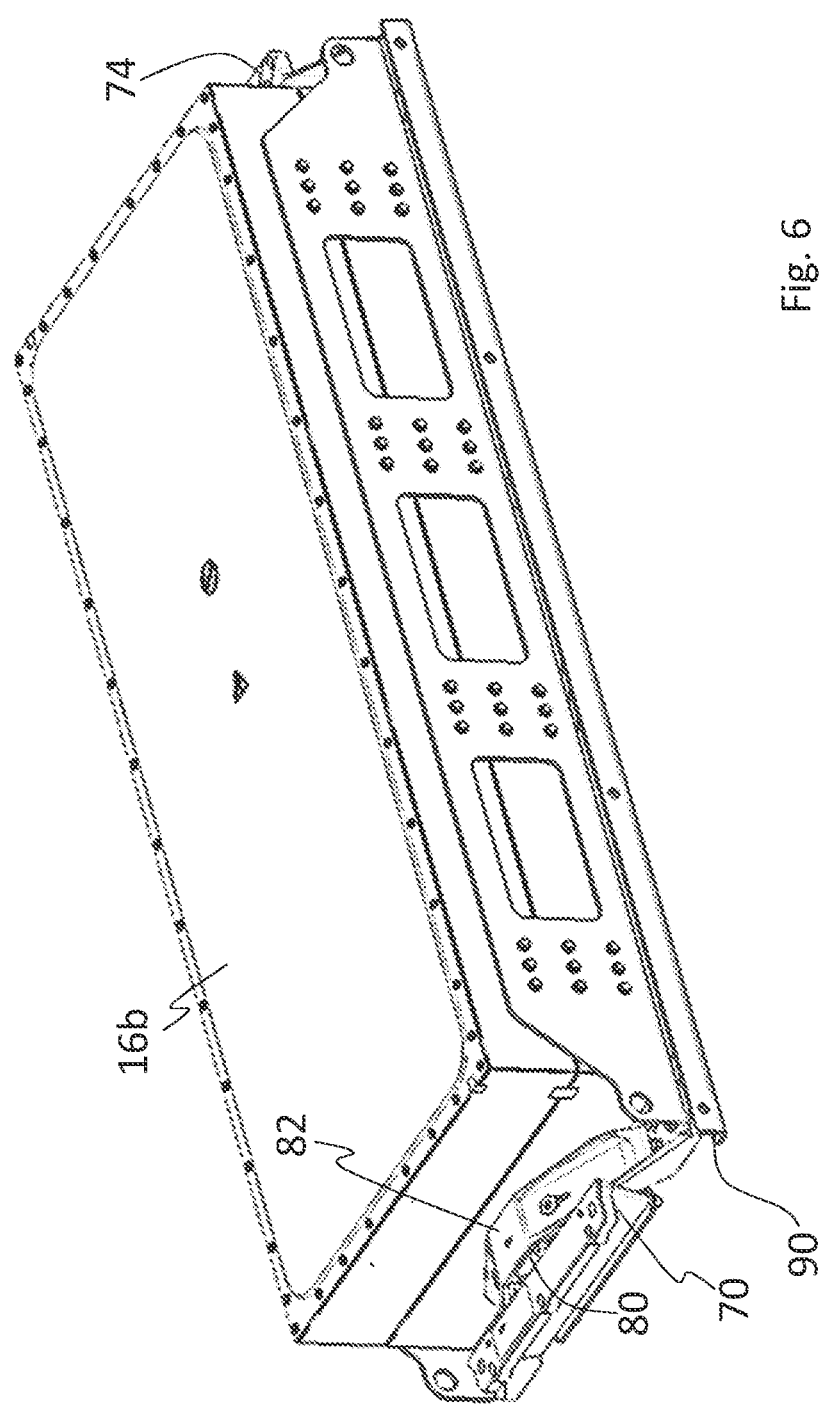
FIG. 6 illustrates the second traction battery after the further parts in FIG. 5 have been connected to the second traction battery.

FIG. 5 illustrates further parts of the system and a second traction battery 16b to which the further parts are connectable, in accordance with at least one exemplary embodiment of the invention. FIG. 6 illustrates the second traction battery 16b after the further parts in FIG. 5 have been connected to the second traction battery 16b. Said further parts substantially correspond to the further parts discussed in connection with FIGS. 3 and 4. Thus, the system further comprises a third slider 70 to be connected to a font side 72 of the second traction battery 16b and a fourth slider 74 to be connected to an opposite rear side 76 of the second traction battery 16b. The third slider 70 is connected to the second traction battery 16b via two rubber parts 80 and a profiled element 82, while the fourth slider 74 is rigidly connected to the second traction battery 16b. A difference, however, is that instead of the protecting bottom plate 60 in FIGS. 3 and 4, there is provided a horizontal side collision protection plate 90 in FIGS. 5 and 6 to which the third slider 70 and the fourth slider 74 may be screw-connected.

FIGS. 7-14 illustrate a sequence in which the first traction battery 16a and the second traction battery 16b are installed in a vehicle.

Figure 7:
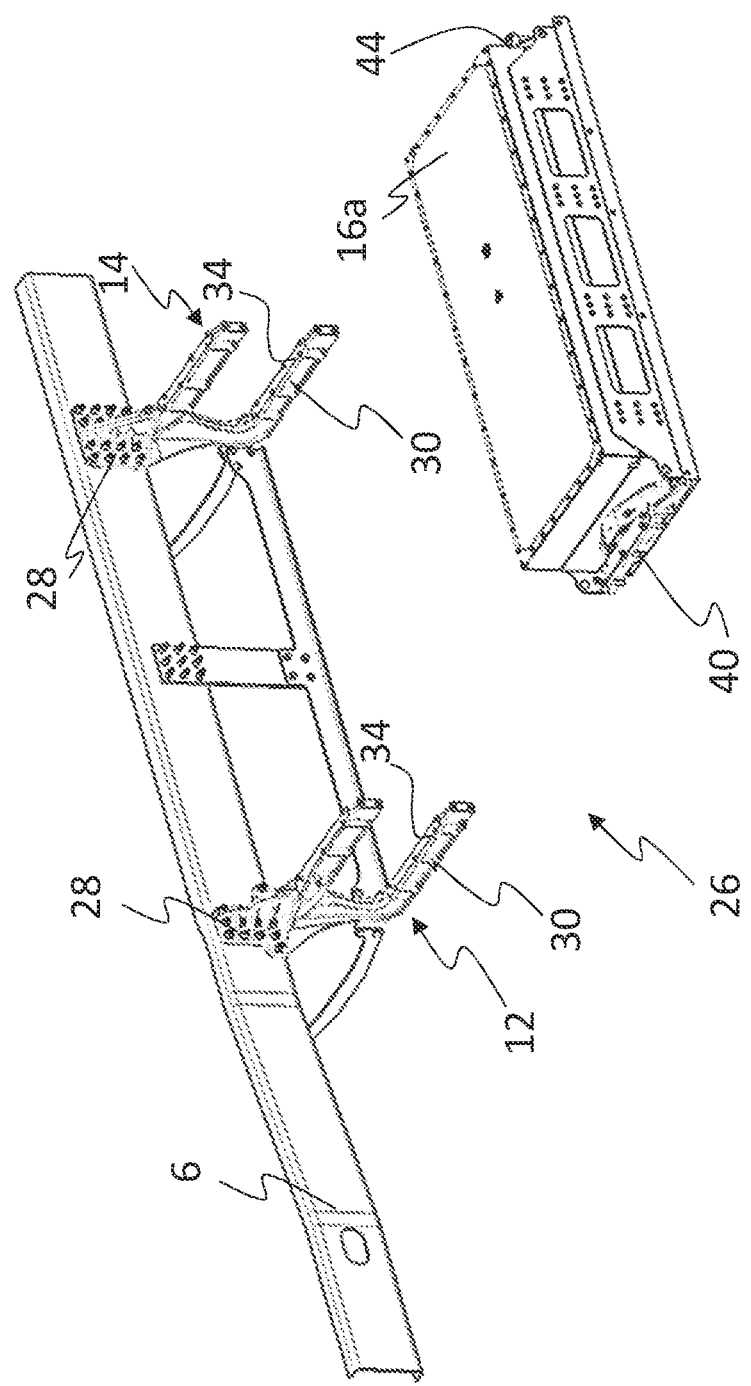

Starting with FIG. 7, after the first slider 40 and the second slider 44 have been mounted to the first traction battery 16a, it may be brought to the receiving structure 26 already secured to the frame member 6.

Figure 8:
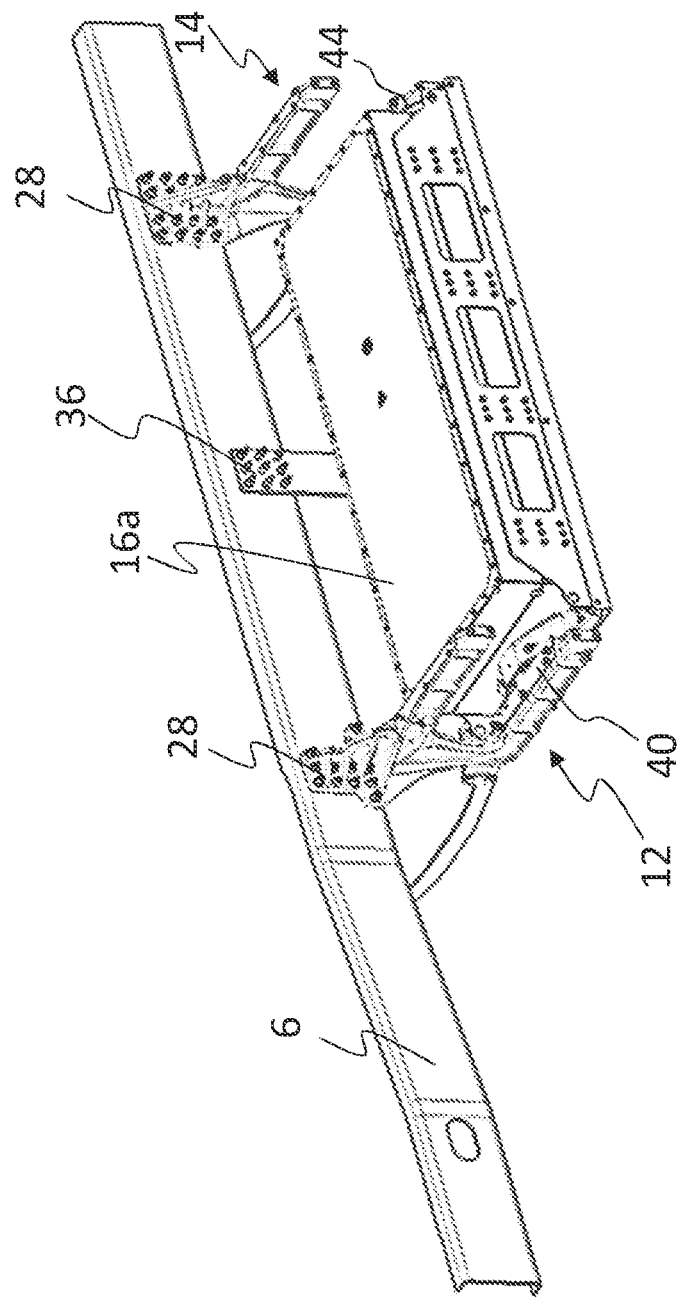

The first slider 40 and the second slider 44 have surfaces facing downwardly which are brought to mate with the sliding surfaces 34 of the lower arm portion 30 of the front bracket member 12 and the lower arm portion 30 of the rear bracket member 14, respectively, and moved into place (for instance, slid into place) close to the frame member 6. This is illustrated in FIG. 8. The securing portions 28 of the front bracket member 12 and the rear bracket member 14, and/or the intermediate securing bracket 36 may provide abutment surfaces which limit lateral movement. Suitably, once in the correct location, the first slider 40 may be secured to the sliding surface 34 of the front bracket member 12, and the second slider 44 may be secured to the sliding surface 34 of the rear bracket member 14, for instance by means of screw-connections.

Figure 9:
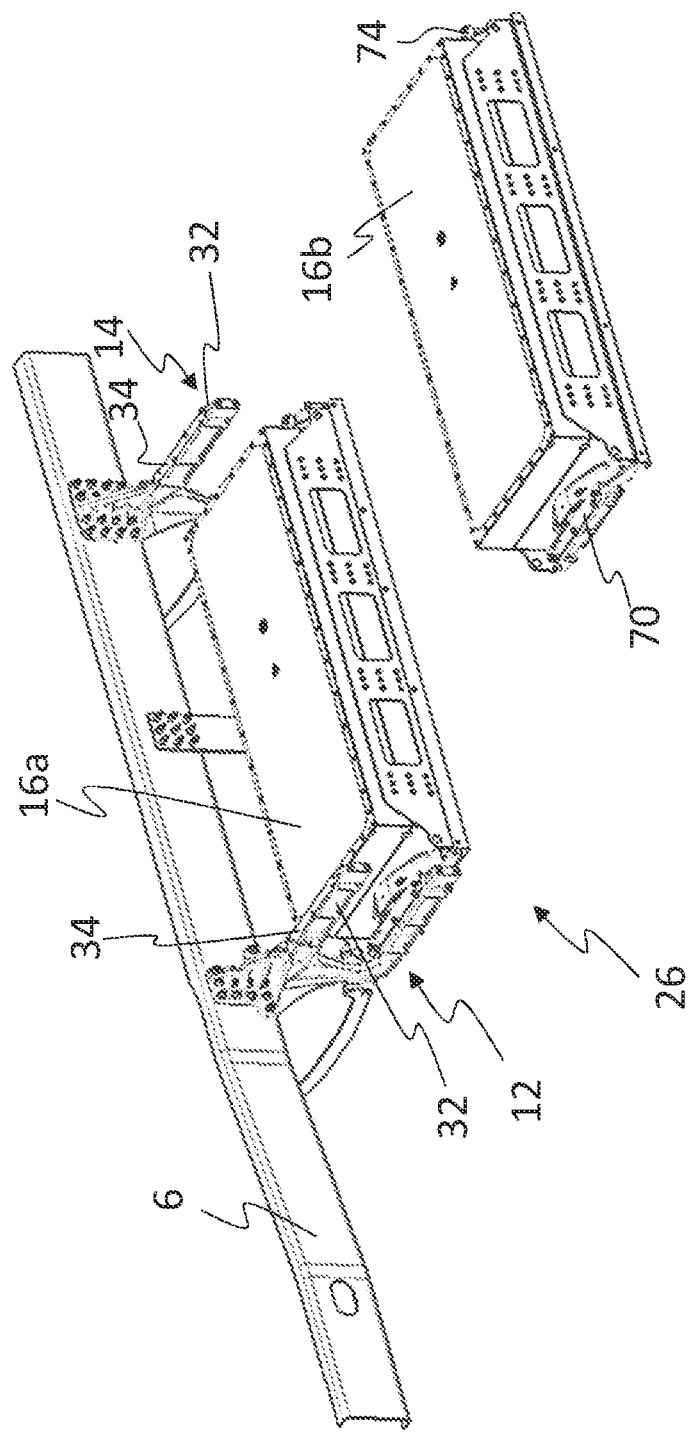

Continuing with FIG. 9, after the third slider 70 and the fourth slider 74 have been mounted to the second traction battery 16b, it may be brought to the receiving structure 26 already secured to the frame member 6.

Figure 10:
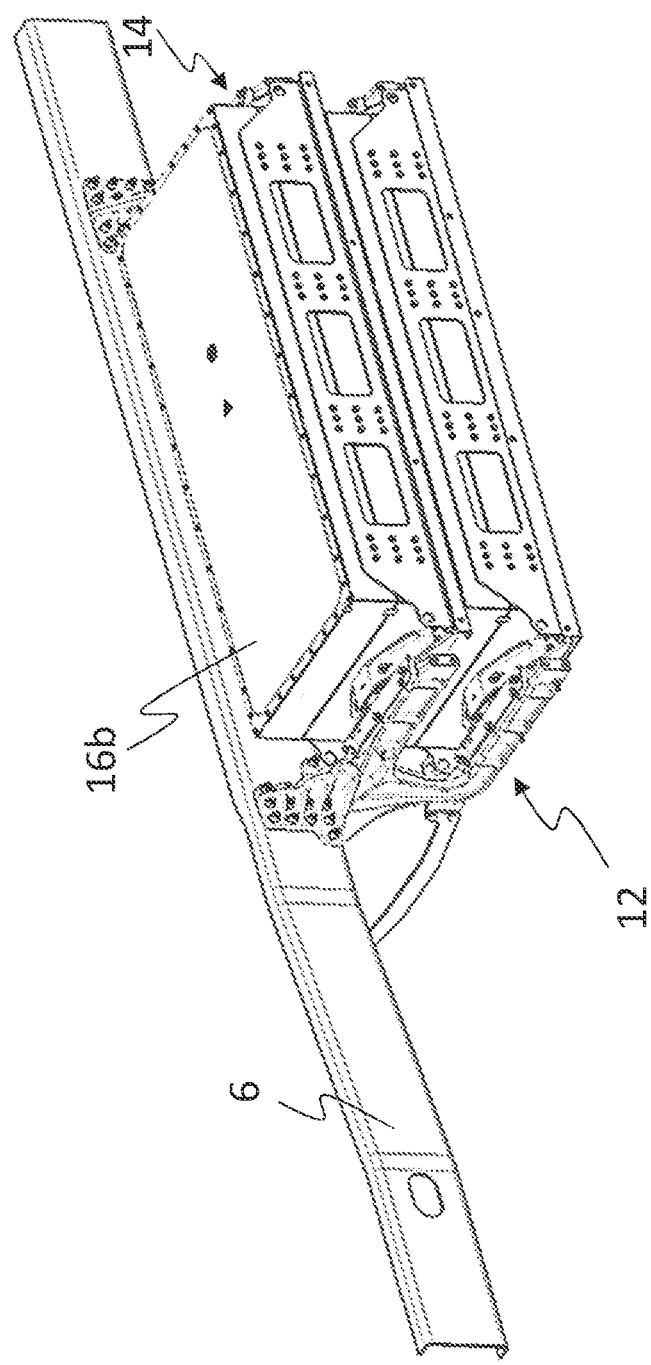

The third slider 70 and the fourth slider 74 have surfaces facing downwardly which are brought to mate with the sliding surfaces 34 of the upper arm portion 32 of the front bracket member 12 and the upper arm portion 32 of the rear bracket member 14, respectively, and moved into place (for instance, slid into place) close to the frame member 6. This is illustrated in FIG. 10.

Figure 11:
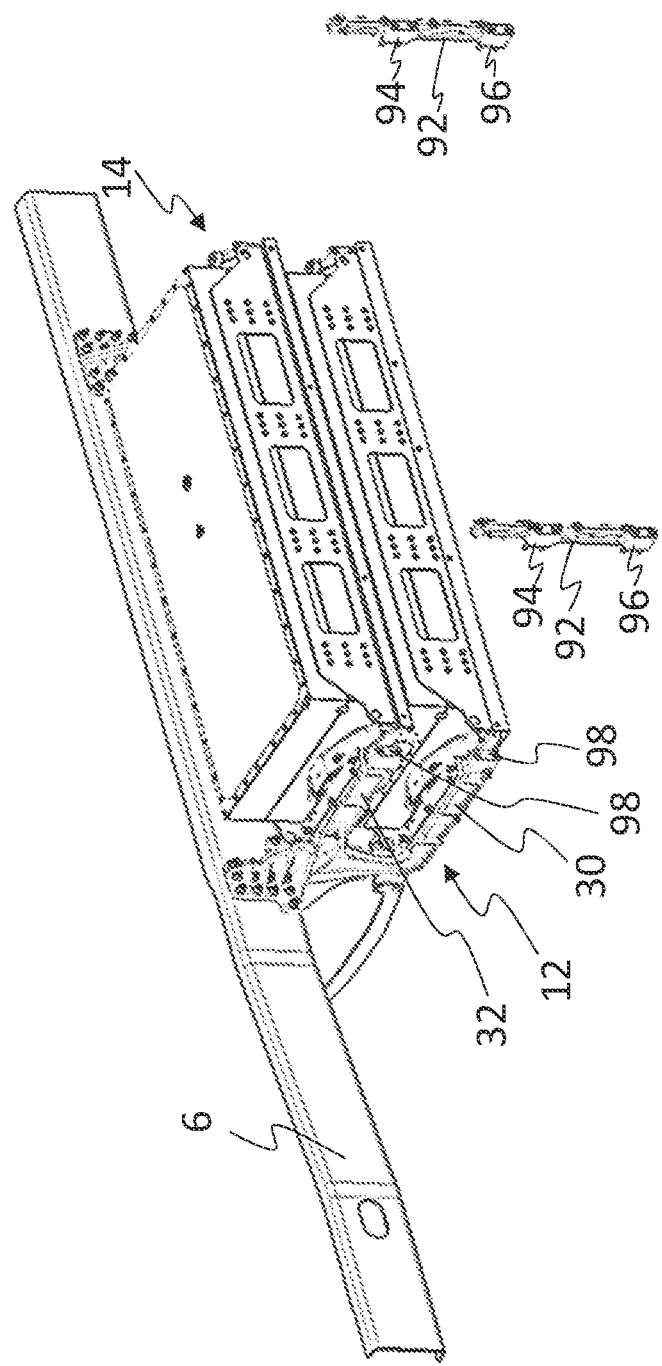

FIG. 11 illustrates that in exemplary embodiments, the system may comprise two vertical connectors 92, each having an upper connecting portion 94 and a lower connecting portion 96 which are configured and dimensioned to mate with the lateral end portions 98 of the upper arm portion 32 and lower arm portion 30, respectively, of one of the front and rear bracket members 12, 14. The connecting portions 94, 96 may suitably be secured to the arm portions 30, 32 by means of a screw-connection.

FIG. 12 illustrates that the vertical connectors 92 have been secured to the arm portions 30, 32. As can be seen in for example FIG. 12, in some exemplary embodiments the vertical connectors 92 have a length substantially corresponding to the vertical extension of the two mounted traction batteries (i.e. substantially the thickness of the first traction battery 16a plus the thickness of the second traction battery 16b).

FIG. 13 illustrates that, in some exemplary embodiments, the system may comprise a crash protection structure 100 adapted to be mounted to the free ends of the arm portions 30, 32. It should be noted that by free ends is meant the end of the arm portion which is not fixed or integrated with the securing portion 28. In other words, the free ends can receive other components, such as exemplified above, the free ends in the form of the lateral end portions 98 (FIG. 11) may receive the vertical connectors 92. The crash protection structure 100 may thus be connected to the lateral end portions via the vertical connectors 92. In other exemplary embodiments, it is conceivable to connect the crash protection structure 100 directly to the lateral end portions. The crash protection structure 100 has been illustrated as a substantially planar fence, grid or gate. However, other configurations of the crash protection structure 100 are conceivable, such as a sheet metal structure, with or without perforations.

As can be seen in FIG. 14, when the crash protection structure 100 has been properly mounted, and the first and second traction batteries 16a, 16b have been received between the front and rear bracket members 12, 14, the traction batteries 16a, 16b are enclosed by the frame member 6 of the vehicle (on a lateral side), the front bracket member 12 (on the front side), the rear bracket member 14 (on the rear side) and the crash protection structure 100 (on the opposite lateral side).

Thus, each arm portion 30, 32 has a longitudinal extension projecting from the securing portion 28 to its free end, wherein, when the crash protection structure 100 is mounted to the free ends of the arm portions 30, 32, the main extension of the crash protection structure 100 lies in a geometrical plane which is perpendicular to the longitudinal extension of the arm portions 30, 32.

In addition to being secured to the arm portions 30, 32 (directly or indirectly via the vertical connectors 92) the crash protection structure 100 may in at least some exemplary embodiments (see FIGS. 3, 5 and 13) be connected to an upwardly bent edge 102 of the protecting bottom plate 60 and/or an upwardly bent edge 104 of the horizontal side collision protection plate 90. Such bent upwardly extending edges 102, 104 may, for instance, be provided with threaded holes for receiving a screw, bolt or the like for securing the crash protection structure 100. However, other fastening means, such as snap connections are also conceivable. Furthermore, it should be understood that in some exemplary embodiment it would be conceivable to have snap connections instead of screw connections for interconnecting other components of the system.

FIGS. 15-16 illustrate a sequence in which the first traction battery 16a and the second traction battery 16b are removed from the vehicle, for instance for being replaced by new traction batteries. As illustrated in FIG. 15, after the crash protection structure and the vertical connectors have been removed, the first traction battery 16a is suitably removed from the lower arm portions 30. This may for instance be by a sliding motion. Next, as illustrated in FIG. 16, second traction battery 16b is removed from the upper arm portions 32. This may, for instance, be by a sliding motion. However, a lifting motion is also conceivable. The removal of the first and second traction batteries 16a, 16b may, for instance, be carried out with the aid of a pallet lifter, a fork lift or any other appropriate tool or device.

FIG. 17 shows a flow chart representation of a method 200 for installation of traction batteries, in accordance with at least one exemplary embodiment of the invention. In particular, the flow chart represents a method 200 for installation of traction batteries to a vehicle having a chassis comprising at least one load-carrying frame member to which a front bracket member and a rear bracket member are secured to and projects from, the rear bracket member being spaced apart from the front bracket member, for receiving a traction battery between the front bracket member and the rear bracket member, wherein each one of the front bracket member and the rear bracket member comprises a respective sliding surface, the method comprising the steps of:

in a first step S1, connecting a first slider to a front side of a traction battery, in a second step S2, connecting a second slider to an opposite rear side of the traction battery, in a third step S3, mating the first slider with the sliding surface of the front bracket member and the second slider with the sliding surface of the rear bracket member subsequently to the first slider and the second slider having been connected to the traction battery, in a fourth step S4, moving the traction battery by means of the connected sliders towards the frame member of the vehicle.

The first step S1 and the second step S2 may be performed in reverse order or may be performed simultaneously. The third step S3 and the fourth step S4 may be performed in the reverse order. For instance, in some exemplary embodiments, the traction battery may be lifted towards the frame member and then mated with the bracket members. However, in other embodiments the traction battery may be first mated with the bracket members and then slid towards the frame member.

It is to be understood that the present invention is not limited to the embodiments described above and illustrated in the drawings; rather, the skilled person will recognize that many changes and modifications may be made within the scope of the appended claims.

The invention claimed is:

1. A system for installation of traction batteries for a vehicle having a chassis comprising at least one load-carrying frame member, the system comprising:

a front bracket member adapted to be secured to and project from a frame member of the vehicle;

a rear bracket member adapted to be secured to and project from the frame member of the vehicle so that the rear bracket member is spaced apart from the front bracket member for receiving a traction battery between the front bracket member and the rear bracket member, wherein each one of the front bracket member and the rear bracket member comprises a respective sliding surface;

a first slider adapted to be connected to a front side of the traction battery; and a second slider adapted to be connected to an opposite rear side of the traction battery, wherein the first slider is adapted to be mated with the sliding surface of the front bracket member and the second slider is adapted to be mated with the sliding surface of the rear bracket member subsequent to the first slider and the second slider having been connected to the traction battery, thereby enabling the traction battery by the connected sliders to be received by the front and rear bracket members and be moved towards the frame member of the vehicle;

wherein each one of the front bracket member and the rear bracket member comprises:
  a securing portion for securing the bracket member to the frame member of the vehicle; and
  at least one arm portion projecting from the securing portion;

the system further comprising a crash protection structure adapted to be mounted to a free end of the at least one arm portion of each one of the front bracket member and the rear bracket member when the traction battery has been received therebetween, such that the traction battery becomes enclosed by the frame member of the vehicle, the front bracket member, the rear bracket member and the crash protection structure.

2. The system of claim 1, comprising a receiving structure, wherein the receiving structure comprises the front bracket member, the rear bracket member and a stabilizing element, wherein the front bracket member and the rear bracket member are spaced apart and interconnected by the stabilizing element, wherein the receiving structure is adapted to be secured to the frame member of the vehicle and adapted to receive the traction battery between the front bracket member and the rear bracket member.

3. The system of claim 1, wherein each one of the front bracket member and the rear bracket member comprises two vertically spaced arm portions, namely a lower arm portion and an upper arm portion, both projecting from the securing portion, wherein each one of the lower arm portion and the upper arm portion is provided with the sliding surface.

4. The system of claim 3:
wherein the lower arm portion of the front bracket member and the lower arm portion of the rear bracket member are adapted to slidingly receive a first traction battery to which the first and second sliders have been connected;

the system further comprising a third slider and a fourth slider, wherein the upper arm portion of the front bracket member and the upper arm portion of the rear bracket member are adapted to slidingly receive a second traction battery to which the third and fourth sliders have been connected.

5. The system of claim 1:
wherein each arm portion has a longitudinal extension projecting from the securing portion to its free end; and wherein, when the crash protection structure is mounted to the free end of the arm portion, the main extension of the crash protection structure lies in a geometrical plane which is perpendicular to the longitudinal extension of the arm portion.

6. The system of claim 1, further comprising a protecting bottom plate adapted to be joined to a lower side of the traction battery.

7. The system of claim 6:
wherein the lower arm portion of the front bracket member and the lower arm portion of the rear bracket member are adapted to slidingly receive a first traction battery to which the first and second sliders have been connected;

the system further comprising a third slider and a fourth slider, wherein the upper arm portion of the front bracket member and the upper arm portion of the rear bracket member are adapted to slidingly receive a second traction battery to which the third and fourth sliders have been connected; and wherein the protecting bottom plate is adapted to be joined to a lower side of the first traction battery, the system further comprising a horizontal side collision protection plate adapted to be joined to a lower side of the second traction battery.

8. The system of claim 1, further comprising a bushing, wherein the first slider is adapted to be connected to the front side of the traction battery via the bushing.

9. The system of claim 8:
wherein the lower arm portion of the front bracket member and the lower arm portion of the rear bracket member are adapted to slidingly receive a first traction battery to which the first and second sliders have been connected;

the system further comprising a third slider and a fourth slider, wherein the upper arm portion of the front bracket member and the upper arm portion of the rear bracket member are adapted to slidingly receive a second traction battery to which the third and fourth sliders have been connected; and comprising two bushings, wherein the bushing is a first bushing for connecting the first traction battery to the first slider, the system further comprising a second bushing for connecting the second traction battery to the third slider.

10. A battery arrangement, comprising:
the system for installation of traction batteries of claim 1; and
the traction battery;
wherein the first slider is connected, or is adapted to be connected, to a front side of the traction battery; and
wherein the second slider is connected, or is adapted to be connected, to an opposite rear side of the traction battery.

11. A vehicle, comprising:
a chassis comprising at least one load-carrying frame member; and
the system for installation of traction batteries of claim 1; and
a battery arrangement comprising:
  the traction battery;
  wherein the first slider is connected, or is adapted to be connected, to a front side of the traction battery; and
  wherein the second slider is connected, or is adapted to be connected, to an opposite rear side of the traction battery; and wherein the front bracket member is secured to and projects from the frame member, and the rear bracket member is secured to and projects from the frame member, spaced apart from the front bracket member.

12. A method for installation of traction batteries to a vehicle having a chassis comprising at least one load-carrying frame member to which a front bracket member and a rear bracket member are secured to and projects from, the rear bracket member being spaced apart from the front bracket member, for receiving a traction battery between the front bracket member and the rear bracket member, wherein each one of the front bracket member and the rear bracket member comprises a respective sliding surface, the method comprising:

connecting a first slider to a front side of the traction battery;

connecting a second slider to an opposite rear side of the traction battery;

mating the first slider with the sliding surface of the front bracket member and the second slider with the sliding surface of the rear bracket member subsequently to the first slider and the second slider having been connected to the traction battery; and moving the traction battery by the connected sliders towards the frame member of the vehicle, wherein the front bracket member, rear bracket member, first slider and second slider are included in the system of claim 1.

* * * * *